Jan. 24, 1961 P. H. SAVET 2,969,182

CARRIER INSENSITIVE A.C. COMPUTER

Filed May 18, 1954

INVENTOR.
PAUL H. SAVET
BY Raymond A. Paquin
ATTORNEY.

United States Patent Office 2,969,182 Patented Jan. 24, 1961

2,969,182

CARRIER INSENSITIVE A.C. COMPUTER

Paul H. Savet, Oceanside, N.Y., assignor to American Bosch Arma Corporation, a corporation of New York Filed May 18, 1954, Ser. No. 430,696

4 Claims. (Cl. 235—183)

The present invention relates to computers, and has particular reference to devices for performing various mathematical operations on alternating voltage signals.

Integration of modulated A.C. signals with respect to time, for example, has been carried out by rather cumbersome methods. In one method the input signal is first demodulated, the resulting proportional D.C. signal is integrated and finally the integrated output is used to modulate an A.C. carrier reference voltage to produce the desired output signal. Conventional integrators which operate on D.C. cannot, of course, be used, since the integration would be performed on the carrier rather than on the envelope or modulating signal. However, the present invention proposes an A.C. analogue of the well known D.C. integrator having a network containing a series resistor and a high gain amplifier with capacity feedback.

In accordance with the present invention the signal whose envelope is to be integrated is applied to a high gain amplifier through a series resistor. A phase sensitive demodulator loaded with a capacitor, is coupled in the feedback circuit of the amplifier.

For operations other than integration, the resistor and capacitor can be replaced by other elements or networks. For example, differentiation can be carried out by using a series capacitor and a resistance loaded demodulator. Multiplication can be accomplished by using two resistors. In general, then, the present invention consists of a network containing a high gain amplifier, an impedance in the input to the amplifier and a phase sensitive demodulator loaded with another impedance connected in the feedback circuit of the amplifier.

For a better understanding of the invention, reference may be had to the accompanying diagrams, in which.

Figure 1:
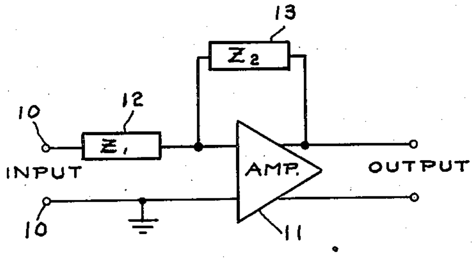
Figure 1 is a general D.C. computing network.

Figure 1 shows in general a well known type of D.C. computing circuit. The D.C. input signal at terminals 10 is applied to the input of a high gain D.C. amplifier 11 through the series impedance 12, while a feedback circuit for amplifier 11 is provided by connecting another impedance 13 between the ungrounded input and output terminals of amplifier 11. The output of the amplifier 11 is also the output of the computer.

Figure 2:
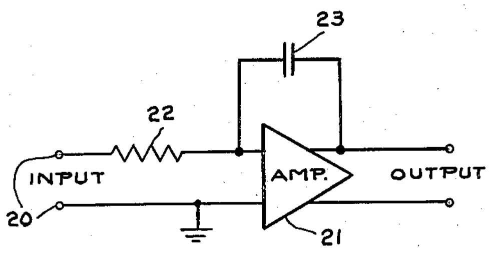
Figure 2 is a D.C. integrator circuit.

Figure 2 shows a particular computer which operates to provide an output voltage proportional to the time integral of the input voltage. The input voltage from terminals 20 is applied to the high-gain amplifier 21 through the series resistor 22, while a capacitor 23 is used as the feedback element. It can be shown that the relationship between the output and input voltages is expressed by $$E_0=-\frac{1}{T}\int_0^t E_i dt \quad (1)$$

where $T=cR$=time constant $c$=value of capacitor 23

$R$=value of resistance 22

$E_0$=output voltage $E_i$=input voltage, and $t$=elapsed time

The derivation of Equation 1 will not be given here since the circuit is well known.

Differentiation can be accomplished in Figure 1 by using a capacitor for impedance 12, and a resistor for impedance 13. Multiplication or division will be carried out if both impedances 12 and 13 are resistors.

Considering now only the integration of alternating current signals, the circuit of Figure 2 can obviously not be used since the output signal will be an integration of the carrier rather than the modulation signal and the output will be a phase shifted amplified input. The desired output, of course, is a voltage of carrier frequency having an envelope proportional to the time integral of the envelope of the input signal.

Figure 3:
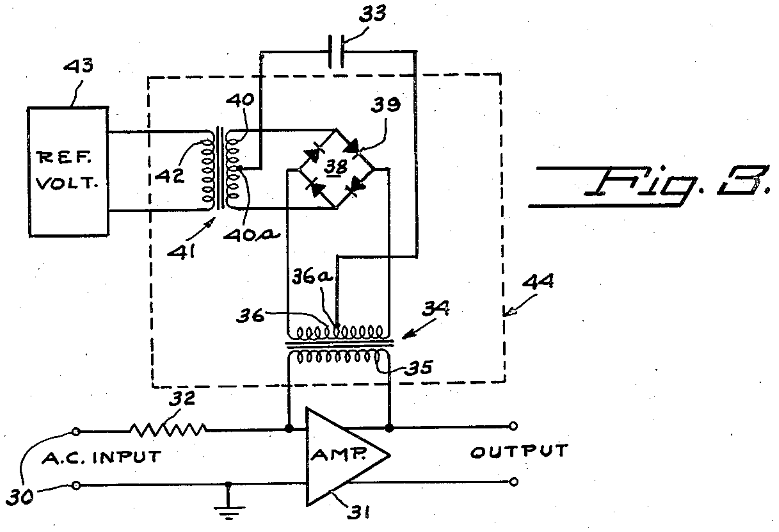
Figure 3 is an A.C. integrator circuit.

In accordance with the present invention the circuit of Figure 3 will perform the desired integration of the alternating input signal voltage. Thus, the input signal at terminals 30 is applied to the input of high gain amplifier 31 through a resistor 32, as in Figure 2, but the feedback circuit contains a transformer 34, the primary winding 35 of which is connected across the ungrounded input terminal and one output terminal of amplifier 31.

It has been found, and is now known, that when a phase sensitive demodulator is loaded, the load has about the same effect on the exciting signal as if the exciting signal were direct current, and the load of the demodulator were connected directly to the exciting signal.

Thus, to have the same effect on the envelope of the feedback voltage from amplifier 31, as the capacitor 23 of Figure 2 has on the feedback from amplifier 21, a phase sensitive demodulator 44 having a capacitor 33 connected across its output is excited by the output of the transformer 34.

To this end, the secondary winding 36 of transformer 34 is connected across one diameter of the rectifier bridge 38 which contains four rectifiers 39. The secondary winding 40 of transformer 41 is connected across the other diameter of the bridge 38. The primary winding 42 of transformer 41 is energized by a constant reference voltage of carrier frequency from power supply 43. The capacitor 33 is connected between the center tap *36a* of transformer winding 36 and center tap *40a* of transformer winding 40.

The network described above which contains the transformers 34 and 41 and the rectifier bridge 38 is a phase sensitive demodulator 44 of well known construction. The demodulator 44 is loaded by the capacitor 33. It should be understood that the particular demodulator shown in Figure 3 is merely illustrative and that any other type of demodulator may be used in its place without departing from the invention.

In a direct current integrator of the type shown in Figure 2, integration of input is accomplished through the feedback of current from output to amplifier input. There is an energy exchange between output and amplifier input at a rate equal to $$C\frac{d}{dt}(E_0^2)$$

such that the voltage at amplifier input is driven to zero.

With respect to integration of the information carrying portions of alternating current signals an energy exchange in the feedback loop proportional to $$C\frac{d}{dt}(V_0^2)$$

must take place. $(E_0=V_0(t)e^{jwt})$.

If $E_1=V_1(t)e^{jwt}$ where the highest frequency of $$V_1(t)<<w/2\pi$$

(modulation frequency is much smaller than the carrier frequency) a feedback, without demodulation through a capacitance C, would cause essentially no average equivalent current flow from $E_0$ to the amplifier input.

However, by inserting a capacitance loaded demodulator between $E_0$ and the amplifier input, a changing current equal to $$\frac{2\sqrt{2}}{\pi}C\frac{dV_0}{dt}$$

will flow through C; and the energy exchange between $E_0$ and the amplifier input will be proportional to $$\frac{2\sqrt{2}}{\pi}C\frac{d}{dt}(V_0^2)$$

Thus, by comparison with the analogous D.C. circuit it will be seen that the operation of the A.C. integrator is equivalent to the D.C. integrator.

It can be mathematically demonstrated that the output of the amplifier 31 is proportional to the integral of the input voltage at terminals 30 with respect to time. This demonstration is rather lengthy and is not essential to the understanding of the invention, however, and for these reasons the demonstration is not reproduced here.

Figure 4:
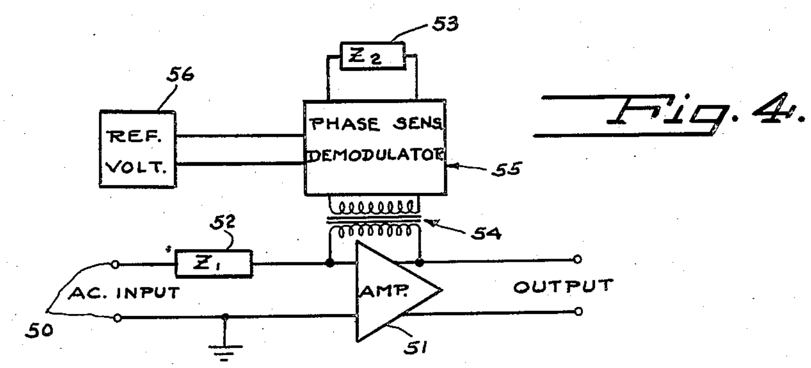
Figure 4 is a general A.C. computing network.

Figure 4 shows, in general, an A.C. computing device similar to the direct current counterpart of Figure 1. The input signal at terminals 50 is applied to the high-gain amplifier 51 through the series impedance 52. The phase sensitive demodulator 55 is coupled to the feedback circuit of amplifier 51 through the transformer 54, while an impedance 53 loads the output of the demodulator 55. The reference voltage of carrier frequency is available from the supply 56.

I claim:

1. In a device of the character described for processing an input signal, an amplifier, a series impedance between said input signal and the input to said amplifier a phase sensitive demodulator connected across one input and an output terminal of said amplifier in a feedback circuit, a reference voltage supply means for said demodulator and a second impedance connected across the output of said demodulator.

2. In a device of the character described for processing an input voltage of carrier frequency modulated by an input signal, an amplifier having an input and an output, a series impedance between said input voltage and the input to said amplifier, a phase sensitive demodulator connected across one input and an output terminal of said amplifier in a feedback circuit, a reference voltage supply means for said demodulator and a second impedance connected across the output of said demodulator.

3. In a device of the character described for processing an input voltage of carrier frequency modulated by an input signal, an amplifier having an input and an output, a series impedance between said input voltage and the input to said amplifier, a phase sensitive demodulator connected across one input and an output terminal of said amplifier in a feedback circuit, said phase sensitive demodulator comprising a rectifier bridge, a transformer having a secondary winding connected across one diameter of said bridge, a second transformer having a secondary winding connected across the other diameter of said bridge, an impedance connected between center taps on said secondary windings, the primary winding of one transformer being connected across one input and one output terminal of said amplifier and the primary winding of the other transformer being energized by a reference voltage of carrier frequency.

4. In a device of the character described for processing an input signal, an amplifier, a series impedance between said input signal and the input to said amplifier, a phase sensitive demodulator connected across one input and an output terminal of said amplifier in a feedback circuit, said phase sensitive demodulator comprising a rectifier bridge, a transformer having a secondary winding connected across one diameter of said bridge, a second transformer having a secondary winding connected across the other diameter of said bridge, an impedance connected between center taps on said secondary windings, the primary winding of one transformer being connected across one input and one output terminal of said amplifier and the primary winding of the other transformer being energized by a reference voltage of carrier frequency.

References Cited in the file of this patent

UNITED STATES PATENTS

| | | |
|---|---|---|
| 2,676,206 | Bennett et al. | Apr. 20, 1954 |
| 2,846,577 | Blasingame | Aug. 5, 1958 |

OTHER REFERENCES

Kritz: "Precision Plasemeter for Audio Frequencies," Electronics, October 1950, pp. 102–106 (particularly Fig. 4, page 104).

Howe et al.: "The Solution of Partial Differential Equations by Difference Methods Using the Electronic Differential Analyzer," Proceedings of the IRE, vol. 41, No. 10, October 1953, pp. 1497–1508 (particularly Fig. 2, p. 1499).